United States Patent
Govorkov et al.

(10) Patent No.: US 7,413,311 B2
(45) Date of Patent: Aug. 19, 2008

(54) SPECKLE REDUCTION IN LASER ILLUMINATED PROJECTION DISPLAYS HAVING A ONE-DIMENSIONAL SPATIAL LIGHT MODULATOR

(75) Inventors: Sergei V. Govorkov, Mountain View, CA (US); Luis A. Spinelli, Sunnyvale, CA (US)

(73) Assignee: Coherent, Inc., Santa Clara, CA (US)

( * ) Notice: Subject to any disclaimer, the term of this patent is extended or adjusted under 35 U.S.C. 154(b) by 567 days.

(21) Appl. No.: 11/238,202

(22) Filed: Sep. 29, 2005

(65) Prior Publication Data

US 2007/0070302 A1 Mar. 29, 2007

(51) Int. Cl.
*G03B 21/14* (2006.01)

(52) U.S. Cl. .............. 353/34; 353/94; 385/116

(58) Field of Classification Search .......... 353/31, 353/34, 94; 359/238; 385/116, 901
See application file for complete search history.

(56) References Cited

U.S. PATENT DOCUMENTS

| | | | |
|---|---|---|---|
| 3,571,493 A | 3/1971 | Baker et al. ............... 178/5.2 |
| 3,818,129 A | 6/1974 | Yamamoto ............... 178/7.3 D |
| 4,360,372 A | 11/1982 | Maciejko ................... 65/402 |
| 4,720,747 A | 1/1988 | Crowley .................... 358/231 |
| 5,192,946 A | 3/1993 | Thompson et al. ......... 340/794 |
| 5,233,460 A | 8/1993 | Partlo et al. .............. 359/247 |
| 5,272,473 A | 12/1993 | Thompson et al. ........... 345/7 |
| 5,313,479 A | 5/1994 | Florence .................... 372/26 |
| 5,317,348 A | 5/1994 | Knize ........................ 353/31 |
| 5,424,771 A | 6/1995 | Yu ............................ 348/203 |
| 5,648,649 A | 7/1997 | Bridgelall et al. ......... 235/462 |
| 5,706,061 A | 1/1998 | Marshall et al. ........... 348/743 |
| 5,740,190 A | 4/1998 | Moulton .................... 372/23 |
| 5,774,487 A | 6/1998 | Morgan .................... 372/45 |
| 5,844,716 A | 12/1998 | Anderson .................. 359/462 |
| 5,894,489 A | 4/1999 | Halldorsson et al. ........ 372/23 |
| 5,990,983 A | 11/1999 | Hargis et al. .............. 348/758 |
| 5,991,318 A | 11/1999 | Caprara et al. ............. 372/22 |
| 6,018,408 A | 1/2000 | Hong ......................... 359/201 |
| 6,069,789 A | 5/2000 | Jung ........................ 361/684 |
| 6,088,102 A | 7/2000 | Manhart ..................... 356/354 |
| 6,097,742 A | 8/2000 | Caprara et al. ............. 372/22 |
| 6,137,631 A | 10/2000 | Moulin ...................... 359/618 |
| 6,154,259 A | 11/2000 | Hargis et al. .............. 348/756 |
| 6,183,092 B1 * | 2/2001 | Troyer ....................... 353/31 |
| 6,191,887 B1 | 2/2001 | Michaloski et al. ......... 359/495 |
| 6,198,756 B1 | 3/2001 | Caprara et al. ............. 372/22 |
| 6,233,025 B1 | 5/2001 | Wallenstein ............... 348/750 |
| 6,249,381 B1 * | 6/2001 | Suganuma ................. 359/618 |
| 6,285,702 B1 | 9/2001 | Caprara et al. ............. 372/92 |
| 6,304,237 B1 | 10/2001 | Karakawa ................... 345/84 |
| 6,323,984 B1 | 11/2001 | Trisnadi ..................... 359/245 |
| 6,353,502 B1 | 3/2002 | Marchant et al. ........... 359/626 |

(Continued)

*Primary Examiner*—William C. Dowling
(74) *Attorney, Agent, or Firm*—Stallman & Pollock LLP

(57) ABSTRACT

A projection display including a one-dimensional light modulator includes an optical arrangement for projecting light from a laser onto the modulator in the form of a line of light. Light from the laser is divided to create in effect a two-dimensional array of mutually incoherent light sources. Light from one axis of the array is projected onto the modulator to form the length of the line of light and light from the other axis of the array is projected onto the modulator to form the width of the line of light. Division of the light is accomplished without the use of any moving component.

17 Claims, 6 Drawing Sheets

U.S. PATENT DOCUMENTS

| | | | |
|---|---|---|---|
| 6,370,168 B1 | 4/2002 | Spinelli | 372/22 |
| 6,393,038 B1 | 5/2002 | Raymond et al. | 372/22 |
| H2045 H | 9/2002 | Busse et al. | 385/31 |
| 6,445,487 B1 | 9/2002 | Roddy et al. | 359/278 |
| 6,483,556 B1 | 11/2002 | Karakawa et al. | 348/750 |
| 6,552,754 B1 | 4/2003 | Song et al. | 348/750 |
| 6,556,294 B2 | 4/2003 | Karpol et al. | 356/237.5 |
| 6,567,584 B2 * | 5/2003 | Carlisle et al. | 385/33 |
| 6,577,429 B1 | 6/2003 | Kurtz et al. | 359/279 |
| 6,594,090 B2 | 7/2003 | Kruschwitz et al. | 359/707 |
| 6,600,590 B2 | 7/2003 | Roddy et al. | 359/287 |
| 6,606,173 B2 | 8/2003 | Kappel et al. | 359/15 |
| 6,614,580 B2 | 9/2003 | Amm | 359/290 |
| 6,621,609 B1 | 9/2003 | Conemac | 359/204 |
| 6,625,381 B2 | 9/2003 | Roddy et al. | 385/147 |
| 6,707,591 B2 | 3/2004 | Amm | 359/290 |
| 6,710,875 B1 | 3/2004 | Zavislan | 356/364 |
| 6,764,183 B2 | 7/2004 | Okazaki | 353/31 |
| 6,774,881 B2 | 8/2004 | Karakawa | 345/84 |
| 6,795,455 B2 | 9/2004 | Scheps | 372/21 |
| 6,798,804 B2 | 9/2004 | Hayakawa | 372/43 |
| 6,801,299 B2 | 10/2004 | Kremer et al. | 355/67 |
| 6,910,774 B2 * | 6/2005 | Troyer | 353/31 |
| 7,055,957 B2 * | 6/2006 | Troyer | 353/31 |
| 2002/0001328 A1 | 1/2002 | Albrecht et al. | 372/50 |
| 2003/0011751 A1 | 1/2003 | Sakata et al. | 353/30 |
| 2004/0036842 A1 | 2/2004 | Tsai et al. | 353/31 |
| 2004/0165621 A1 | 8/2004 | Chuang et al. | 372/25 |
| 2004/0257664 A1 * | 12/2004 | Hashimoto et al. | 359/636 |
| 2005/0008290 A1 | 1/2005 | Miron | 385/27 |
| 2007/0268458 A1 * | 11/2007 | Lee et al. | 353/31 |

* cited by examiner

SPECKLE REDUCTION IN LASER ILLUMINATED PROJECTION DISPLAYS HAVING A ONE-DIMENSIONAL SPATIAL LIGHT MODULATOR

TECHNICAL FIELD OF THE INVENTION

The present invention relates generally to laser projection displays that include a spatial light modulator and some arrangement for reducing or minimizing speckle contrast in the display. The invention relates in particular to laser projection displays wherein the spatial light modulator array is a one-dimensional array, and a two-dimensional display is achieved by scanning a beam reflected or diffracted by the one-dimensional array over a display screen.

DISCUSSION OF BACKGROUND ART

In prior-art laser illuminated displays, a common arrangement for reducing speckle contrast includes providing diversity of incidence angle, polarization or wavelength of the beam, alone or in combination, at each point of the display screen, in order to form a number N of different and uncorrelated speckle patterns. In an arrangement described in U.S. patent application Ser. No. 11/011,736, file Dec. 14, 2004, angular diversity of the beam is provided and a condition of un-correlation is achieved by separating, in time, the beam incident on the screen at different angles, with the range of different angles being presented within the normal integration time period of a human eye. This arrangement is preferred for displays including a two-dimensional spatial light modulator, although the arrangement is not ineffective in a display including a one-dimensional light modulator. A one-dimensional light modulator is different from a two-dimensional light modulator in terms of requirements for a light source illuminating the modulator and for speckle-reduction means.

One preferred prior-art arrangement for speckle reduction in a display including a one-dimensional modulator includes the use of a vibrating phase mask. A brief description of such a prior-art display is set forth below with reference to FIG. 1.

Here a display 20 is illuminated by a red laser, a green laser, and a blue laser (not explicitly shown). Beam-forming optics 22, 24, and 26 form a line-shaped illumination pattern from respectively the red, green and blue laser light on one-dimensional (linear) spatial light modulators 28, 30, and 32, respectively. The length dimension of the modulators is perpendicular to the plane of FIG. 1

In this example, it is assumed that the linear modulators are diffractive modulators of the grating light-valve (GLV) type. This type of modulator includes a plurality of microscopic reflective elements or beams arranged parallel to each other in a linear array. The reflective elements can be individually raised and lowered by electrostatic attraction. The reflective elements function as a diffraction grating that can cause varying amplitudes of diffraction along the line of light incident thereon. The varying diffraction amplitudes represent image information in one line of a display image to be projected. Light reflected and diffracted from the three modulators is combined by beam combining optics 34, for example, a Philips prism, and directed to imaging optics 36.

Imaging optics 36 include lenses 38 and 40 having a mask 42 therebetween that passes light diffracted into the +1 and −1 orders of the diffraction grating, and rejects light diffracted in the zero order (specularly reflected) of the diffraction grating. Mask 42 is usually referred to as a Schlieren filter or a Fourier filter by practitioners of the art. Imaging optics 36 create an intermediate composite image of the three modulators, using the +1-order diffracted light therefrom, on a speckle-reduction arrangement 44. Speckle-reduction arrangement 44, in this example, is assumed to be a reciprocating phase-mask. The intermediate image is re-imaged by projection optics 46 via a galvanometer scanning mirror 48 on a screen 50. The projected image forms one line of a display to be projected on the screen, the line, here, having a length perpendicular to the plane of FIG. 1. Galvanometer mirror 48 is scanned, as indicated by arrows A, step-wise, projecting a new line of the image at each step. A complete scan between positions 52A and 52B is performed sufficiently fast that the sequentially projected line-images appear to a viewer as a two-dimensional image. The two-dimensional image is a bit map having as many width elements as there are beams (grating lines) in each the linear modulators, and as many height elements as there are sequentially projected images on the screen. A one-dimensional GLV modulator can have as many as 1080 beams.

In a phase-mask speckle-reduction arrangement such as arrangement 44, a plate having a spatially varied thickness providing a particular ordered phase pattern is rapidly, reciprocally translated at the intermediate image position. The rate of reciprocation is selected such that this causes uncorrelated phase patterns representing image points on the screen to be averaged at a rate that exceeds the resolution limit of the eye. This requires mechanically translating the phase mask in the beam, so that a maximum number N (for example, N=64) of uncorrelated phase patterns can be presented within the integration time. The maximum number of patterns that needs to be presented is dependent on the maximum possible ratio of speckle contrast reduction $r_{max}$. The value of $r_{max}$, in turn, is determined by the ratio of a solid angle $\Omega_{tot}$ subtended by the projection optics at the screen, to a solid angle $\Omega_{eye}$ subtended by the observer's pupil at the screen. The following relationships exist for N, $r_{max}$, $\Omega_{eye}$, and $\Omega_{tot}$.

$$r_{max} = (\Omega_{tot}/\Omega_{eye})^{1/2} \quad (1)$$

$$N < r_{max}^2 \quad (2)$$

The projection optics speed ($\Omega_{tot}$) is limited, by the acceptance angle of the one-dimensional modulators, and the size and cost of the projection lens, among other factors. Only uncorrelated patterns are effective in determining the relationships. Accordingly, presenting more correlated patterns will not increase speckle contrast reduction. The object of the reciprocating phase-mask is to be able to present $N \sim r_{max}^2$ phase patterns that lead to N uncorrelated speckle patterns at the screen, within the integration time of the human eye. This results in an "optimal" speckle reduction, meaning a reduction equal to $r_{max}$, with a minimal number of patterns N, which translates to a minimal time required to present these patterns. The minimal time is important, and this is what makes the case of one-dimensional modulator much more challenging for speckle reduction, compared to a two-dimensional modulator. The reason is that the laser beam actually illuminates each particular resolvable spot of the screen only for a fraction of the total integration time of the eye, due to the scanning. Accordingly, a "non-optimal" set of patterns, for example, a set that includes mutually correlated patterns, may require more time to present, and lead to a lesser reduction ratio.

One disadvantage of this speckle reduction approach is that the phase-mask must be reciprocally translated at high frequency, for example about 30 Hz or greater, in the intermediate image plane. This requires a complex, delicate mechanism. A related disadvantage is that imaging optics 36 has to form the image in the intermediate image plane, which adds to the complexity and cost of optics in the display. An additional difficulty with one-dimensional modulators, in general, is that the line of light projected from a laser onto a modulator must be well focused in one plane, as a modulator is typically only about 25 micrometers (μm) wide. If a single-mode laser is used as an illuminating laser this does not present a problem, however, it is usually preferred to a multimode diode-laser arrays (bar), including a plurality of individual emitters, as the illuminating laser. One reason for this is the simplicity, cost, and available power of such a bar. In a diode-laser array, the "fast" axis of the output beam (perpendicular to the length of the array) is readily focusable, but individual emitters in the array are often misaligned in the length direction by several micrometers, an effect whimsically referred to as the "smile" of the array by practitioners of the art. This can create difficulty in imaging the length of the array on the modulator, which is usually exactly straight.

There is a need for a one-dimensional modulator display system, including a speckle-reduction arrangement that does not include any moving parts. The speckle-reduction arrangement should be suitable for illuminating a one-dimensional modulator using multimode lasers in general, and using diode-laser arrays in particular.

SUMMARY OF THE INVENTION

The present invention is directed to a method of projecting light from a coherent-light source onto a one-dimensional spatial light modulator as a line of light having a length and a width. In one aspect the method comprises dividing the light from the coherent-light source in a manner such that the divided light is formed, in effect, into a rectangular, two-dimensional array of $N_1 \times N_2$ mutually incoherent light-sources. Adjacent sides of the array are aligned with X and Y Cartesian axes. X-axis light from the mutually incoherent light-sources is projected onto the spatial light modulator to form the length of the line of light. Y-axis light from the mutually incoherent light-sources is projected onto the spatial light modulator to form the width of the line of light. The light-dividing step is accomplished without any moving components.

In certain preferred embodiments the coherent-light source is a laser delivering a single beam of coherent light. The dividing step is accomplished in two stages. First the beam is divided into $N_1$ portions in the X-axis and then each of the $N_1$ portions is divided into $N_2$ parts in the Y-axis. The numbers $N_1$ and $N_2$ may be the same or different. A division step may be accomplished by an arrangement of optical fibers, a multipass optical delay line, or a stepped optical element having steps thereof aligned with either the X-axis or the Y-axis. In another preferred embodiment, the coherent-light source is a diode-laser bar having $N_1$ spaced-apart emitters. Each of the emitters is coherent-light beam, however, the coherent light beams are not coherent with each other. Each of the $N_1$ coherent light is divided into $N_2$ portions by a stepped optical element.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the present invention.

DETAILED DESCRIPTION OF THE INVENTION

Figure 1:
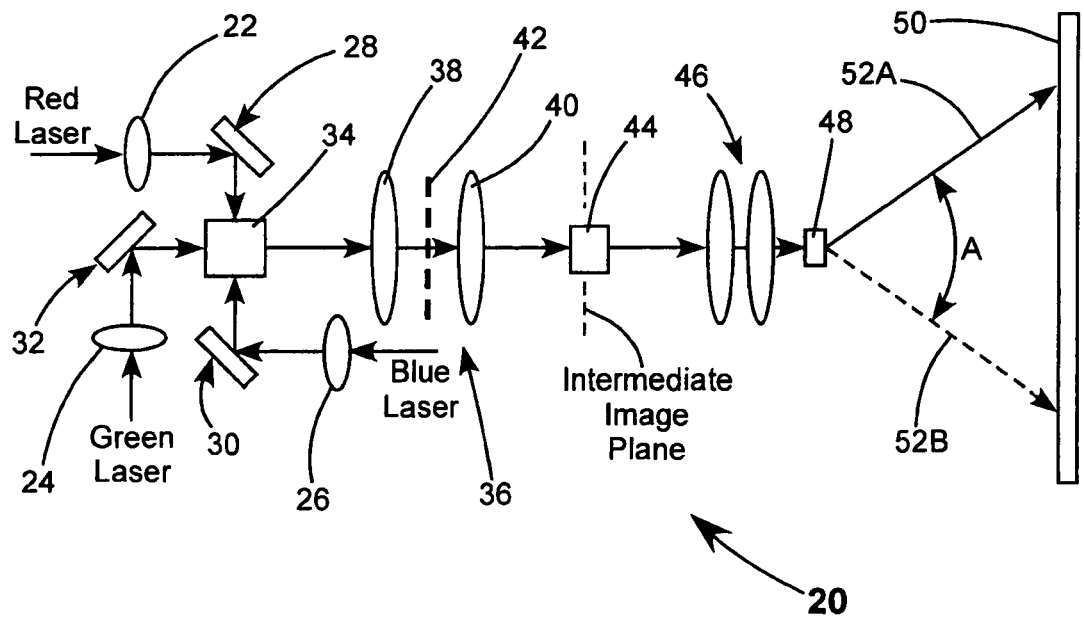
FIG. 1 is an optical block-diagram schematically illustrating a prior-art, one-dimensional-modulator projection display including beam-forming optics, imaging optics and projection optics, and having a speckle-reduction arrangement located at an intermediate focal point between the imaging optics and the projection optics
Figure 2:
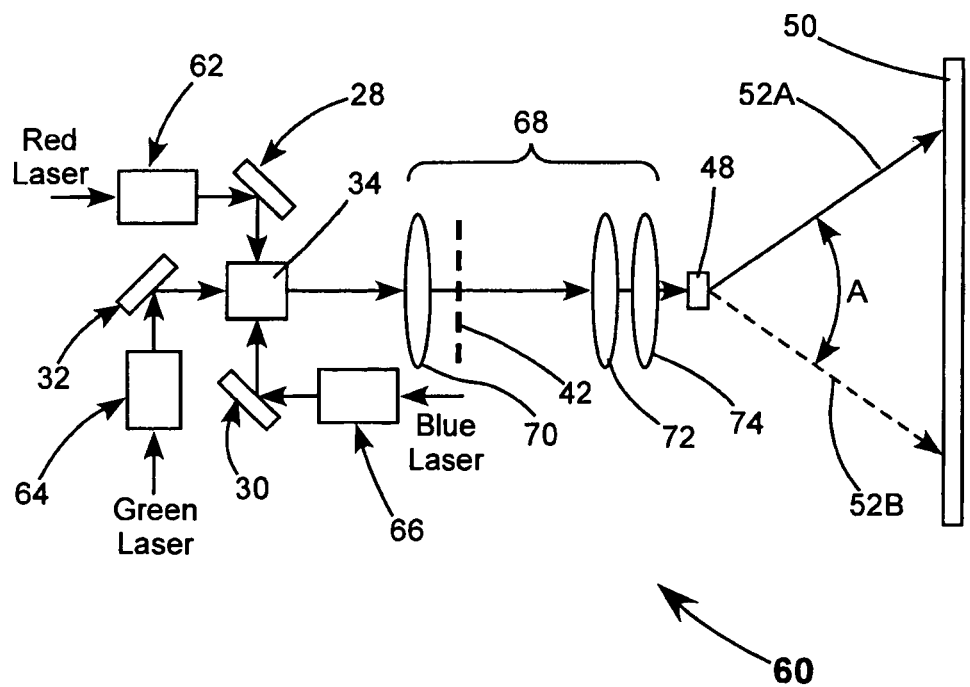
FIG. 2 is an optical block-diagram schematically illustrating one preferred embodiment of a one-dimensional-modulator projection display in accordance with the present invention, including beam-forming optics, imaging optics and projection optics, and wherein there is no intermediate focus between the imaging optics and the projection optics, and a speckle-reduction arrangement is combined with the beam-forming optics.

Referring now to the drawings, wherein like components are designated by like reference numerals, FIG. 2 schematically illustrates, in optical block-diagram form, one preferred embodiment 60 of a laser-illuminated (coherent-light illuminated), one-dimensional-modulator projection display in accordance with the present invention. As display 60 has certain features in common with above-described prior-art display 20, only differences between the displays are described below.

In display 60, beam-forming optics 22, 24, and 26 of prior-art display 20 are replaced by beam-forming and speckle-reduction modules 62, 64, and 66 respectively. By effecting speckle-reduction measures on light from the illuminating lasers before the light from the lasers is projected onto the modulators, the need for the separate imaging and projection optics of laser 20, having an intermediate focus therebetween, is eliminated, and optics 36 and 46 of display 20 are replaced in display 60 by a simplified projection optics 68 comprising lenses 70, 72, and 74. These lenses may be a single optical element, or may include a plurality of optical elements cemented together or air-spaced.

A goal of combining speckle-reduction arrangements with beam-forming or illuminating optics is to create from each of the illuminating lasers (coherent illumination light-sources) an effectively incoherent illumination source, with the output solid angle and spatial extent the source arranged to match the acceptance solid angle and spatial extent of the modulator. A description of one preferred example 62A of a combined beam-forming optics and speckle-reduction arrangement in accordance with the present invention is set forth below with reference to FIG. 3A and FIG. 3B.

It assumed in arrangement 62A that a laser 80 provides a single output beam 82. The arrangement is defined as having mutually orthogonal (Cartesian) X, Y, and Z-axes where the Z-axis defines the general direction of propagation of light and may be "folded" by turning mirrors and the like. The X-axis may be referred to alternatively as the long-axis as it is in this axis that the length of a line of light focused on the modulator is aligned. The Y-axis may be referred to as the short-axis as it is in this axis that width of the projected line of light is aligned.

Beam 82 is delivered into a optical fiber 84 that has a plurality of branch or output fibers 86 (here eight) extending therefrom, here, in a plurality of stages. Optical fiber 84 may be a single-mode fiber or a multimode fiber. Focusing optics will usually be required for focusing such a beam into the fiber, but are not shown in FIGS. 3A and 3B for simplicity of illustration. The form of such optics will depend on parameters of the laser beam, and such optics are well known to practitioners of the art.

A maximum number $N_1$ of branch fibers that is practical for optimum speckle reduction can be derived from an equation:

$$N_1 < \Theta_{acc\_y}/(\Theta_{eye}*M) \quad (3)$$

where $\Theta_{acc\_y}$ is an in-plane, Y-axis, acceptance angle of the linear modulator to which a line of light will be delivered; M is the magnification ratio of projection optics 86; and $\Theta_{eye}$ is the angle subtended by the pupil of an viewer's eye at any point on screen 50. Typically, $N_1$ is about 8.

Branch fibers 86 are arranged in such manner that the optical distance from the input of the optical fiber 84 to the output end of each branch fiber is different. Preferably the optical distance along each of $N_1$–1 of the branch fibers is incremented with respect to that along a previous one of the branch fibers by a length greater than the coherence length of the light from the laser. By way of example, for light having a wavelength of 0.5 μm and a spectral bandwidth of 0.1 nm, the coherence length is about 1.5 mm in an optical fiber with effective refractive index of about 1.5. By arranging the lengths of the branch fibers to be different in this way, a linear array of $N_1$ mutually incoherent light sources is effectively formed, here, aligned in an X-Y plane 88 by aligning output ends of branch fibers 86 in that plane. The branch fibers are also spaced-apart from each other with output ends thereof parallel to each other in a Y-Z plane.

Arrangement 62A includes, an array 90 of cylindrical lenses 92 having positive optical power in the X-axis and zero optical power in the Y-axis. Preferably there are as many lenses 92 in array 90 as there output fibers 86 extending from optical fiber 84. Arrangement 62A also includes two cylindrical lenses 94 and 96 spaced apart in the Z-axis direction. Lenses 94 and 96 have positive optical power in the Y-axis and zero optical power in the X-axis. Located between cylindrical lenses 94 and 96 is a stepped element or prism 98 having a plurality of stair-step sections 100 each of which has a different thickness parallel to the Z-axis direction. Stepped element 98 may a monolithic prism with a stepped face, or may be formed from an optically a bonded pile of plates of different widths. Element 98 is arranged with sections 100 thereof parallel to the X-axis, i.e., parallel to the plane in which output ends of output fibers 86 are spaced apart. Element 98 has zero optical power in both the X-axis and the Y-axis. The purpose of element 98 is explained further hereinbelow.

Figure 3A:
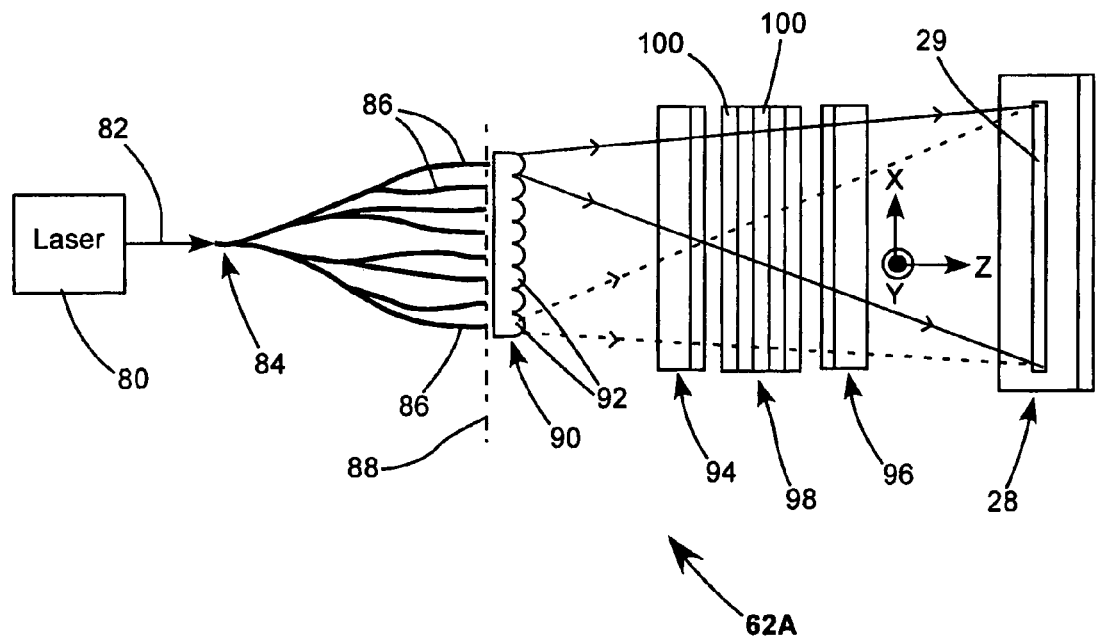
FIG. 3A is an X-axis elevation view schematically illustrating one preferred example in accordance with the present invention of a beam-forming and speckle-reduction arrangement in the projection display of FIG. 2, the beam-forming and speckle-reduction arrangement including a laser, an optical fiber arrangement for coupling light from the laser into a plurality of optical fibers, and a stepped optical element for introducing optical path differences in light delivered from each of the plurality of optical fibers.
Figure 3B:
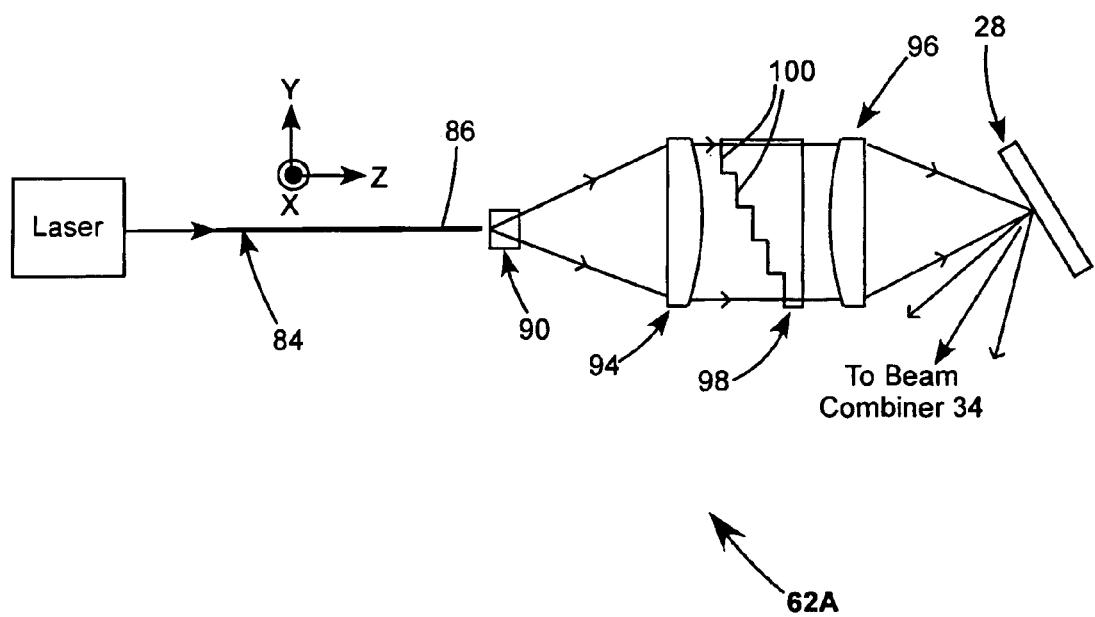
FIG. 3B is a Y-axis plan view from below of the beam-forming and speckle-reduction arrangement of FIG. 3A.

The X-axis optical power of lenses 92, the Y-axis optical power of lenses 94 and 96, the spacing between plane 88 and lenses 92, and the spacing between lenses 92, 94 and 96, inter alia, are arranged such that the output light from each branch fiber 86 illuminates the entire length of active elements of the linear modulator (indicated in FIG. 3A by elongated rectangle 29) and rays from each output fiber 86 are collimated in the Y-axis between lenses 94 and 96. Diffracted and reflected rays are directed from the modulator to beam combining arrangement 34 of the display. In FIG. 3A only two rays from each of opposite end lenses 92 in lens array 90 are traced for simplicity of illustration. In FIG. 3B only two Y-axis rays from one output fiber 86 are traced. In this arrangement, each of the output fibers will create an uncorrelated speckle pattern at screen 50. Preferably the diameter and numerical aperture (NA) of the output fibers 86 are matched to the width and acceptance angle of the modulator. Tapering of fibers 86 may be found advantageous in this regard.

Continuing with reference to FIGS. 3A and 3B, the purpose of stepped element 98 between lenses 94 and 96 is to provide angular diversity of light incident on the modulator parallel to the Y-Z plane, i.e., parallel to a plane orthogonal to the length direction of the modulator. Steps 100, in effect, provide a plurality of sectors between lenses 94 and 96 with rays propagating within each sector following a different path length. A maximum number of sectors, i.e., steps in element 98, $N_2$ can be derived from an equation $$N_2 < \Theta_{acc\_x}/(\Theta_{eye}*M) \quad (4)$$

where $\Theta_{acc\_x}$ is the out-of-plane acceptance angle of the linear modulator, $\Theta_{eye}$ is the angle subtended by the screen by the pupil of a viewer's eye, and M is the magnification ratio of optics 86. The sectors preferably differ in optical path length by the degree discussed above with reference to the optical path difference in branch fibers 86.

A net result of providing the different path length in the fibers and the stepped optical element is the division of the laser (coherent) light to create in effect a two-dimensional set (array) of $N_1*N_2$ mutually incoherent sources of illumination of the modulator. As each source produces rays separated from each other by an angle equal to or greater then $M*\Theta_{eye}$, the sources produce different speckle patterns that are un-correlated. Accordingly, the speckle contrast reduction ratio is equal to $(N_1*N_2)^{1/2}$ and, in principle, is equal to $r_{max}$. This is achieved without any moving parts.

It should be noted here that the above-described fiber arrangement, wherein all branch or output fibers originate from a single input fiber, should not be considered limiting. Those skilled in the art will recognize that a portion of the branch fibers may originate in one fiber with the remaining fibers originating in one or more other fibers. By way of example, in a fiber arrangement having eight output fibers as discussed above there may be two input fibers each having four output fibers; two output fibers, one thereof having five output fibers and the other having three output fibers; four input fibers each thereof having two output fibers; eight individual fibers each thereof having an input end and an output end; and other combinations of input and output. For light from a single, coherent, laser beam. These combinations should, of course, include a path difference in the fibers as described above.

What is important from the point of view of speckle reduction is the number of output fibers, and the path difference from any input point to the output end of the output fibers. The number of input ends or input fibers will usually be selected according to the efficiency of coupling a particular laser beam into the fibers.

By way of example, when a light source for any laser color is provided by a linear array of diode-laser emitters in a diode-laser bar, individual rather than branched fibers may be used with one fiber for each emitter. Output ends of the individual fibers can be precisely aligned to eliminate effects of above-discussed "smile" problems that are common in diode-laser bars. In this case, the fibers need not be of different length, as the emitters of a diode-laser array are mutually incoherent. That is to say, even though beam of light from any one emitter is coherent, the beams are not coherent with each other.

Figure 4A:
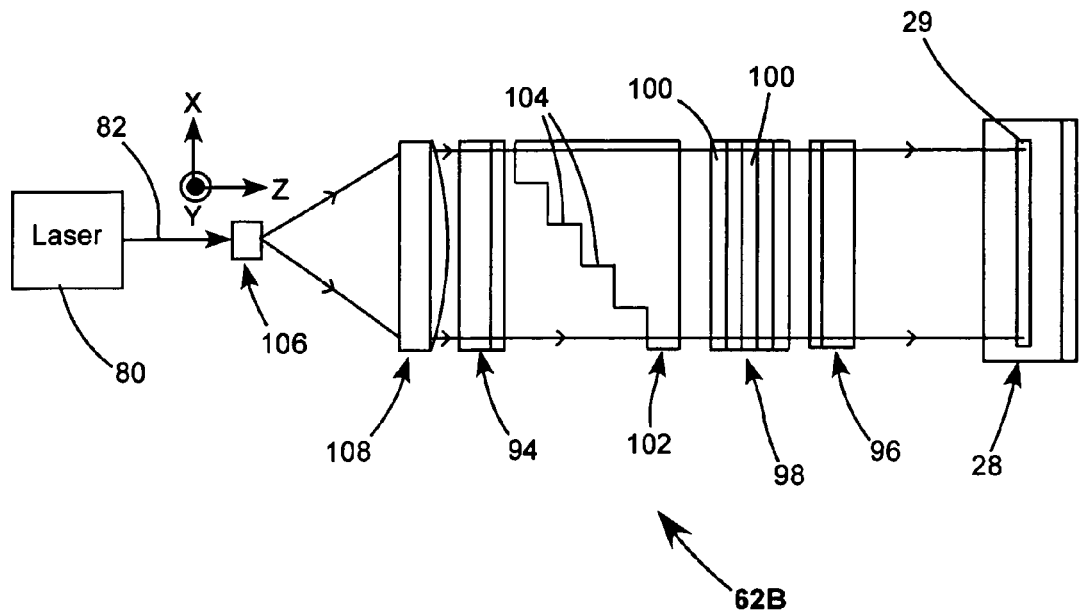
FIG. 4A is an X-axis elevation view schematically illustrating another preferred example in accordance with the present invention of a beam-forming and speckle-reduction arrangement in the projection display of FIG. 2, similar to the arrangement of FIGS. 3A and 3B, but wherein the optical fiber arrangement is replaced by a second stepped optical element arranged with steps thereof orthogonal to steps of the first optical element.
Figure 4B:
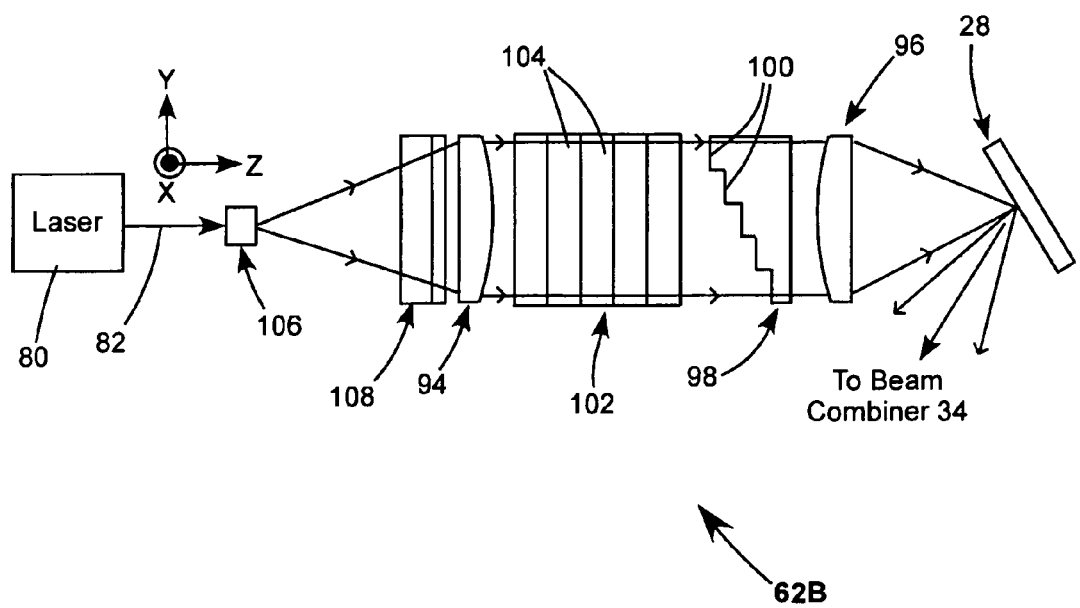
FIG. 4B is a Y-axis plan view from below of the beam-forming and speckle-reduction arrangement of FIG. 4A.

FIG. 4A and FIG. 4B schematically illustrate another preferred example 62B of a combined beam-forming optics and speckle-reduction arrangement in accordance with the present invention. As arrangement 62B has features in common with arrangement 62A of FIGS. 3A and 3B, only differences between the arrangements are described below. In arrangement 62B, the fiber arrangement for providing an X-axis array of uncorrelated light-sources is replaced by a second stepped optical element or prism 102 having a plurality of stair-step sections 104 each of which has a different thickness in the Z-axis direction. Element 102 is arranged with sections 104 thereof parallel to the Y-axis, i.e., orthogonal to the stair-step sections of stepped element 98. Both stepped elements are located between cylindrical lenses 94 and 96 which are configured (except for the spacing therebetween) as specified above.

Light beam 82 from laser 80 is directed into an optical device 106 that causes beam 82 to diverge more or less symmetrically onto a cylindrical lens 108, here, having positive optical power in the X-axis and zero optical power in the Y-axis. By way of example, optical device 106 can be a negative lens, an optical fiber, a diffuser, or the like. Cylindrical lens 108 is configured and arranged with respect to device 106 such that light incident thereon is collimated in the X-axis. The X-axis collimated light traverses cylindrical lens 94, stepped element 102, stepped element 98, cylindrical lens 96, and fills essentially the entire length of elements 29 of modulator 28. As cylindrical lens 108 has zero Y-axis optical power, Y-axis light from device 106 passes through with divergence unchanged, is collimated by cylindrical lens 94, traverses stepped elements 102 and 98, and is focused by cylindrical lens 96 onto modulator elements 29. A net result of providing the orthogonally oriented stepped optical elements is the creation in effect of a two-dimensional set of $N_1*N_2$ mutually incoherent sources of illumination for the modulator, where $N_1$ and $N_2$, here, are the number of steps in respectively the first and second stepped elements. $N_1$ and $N_2$ may be the same or different.

Figure 5A:
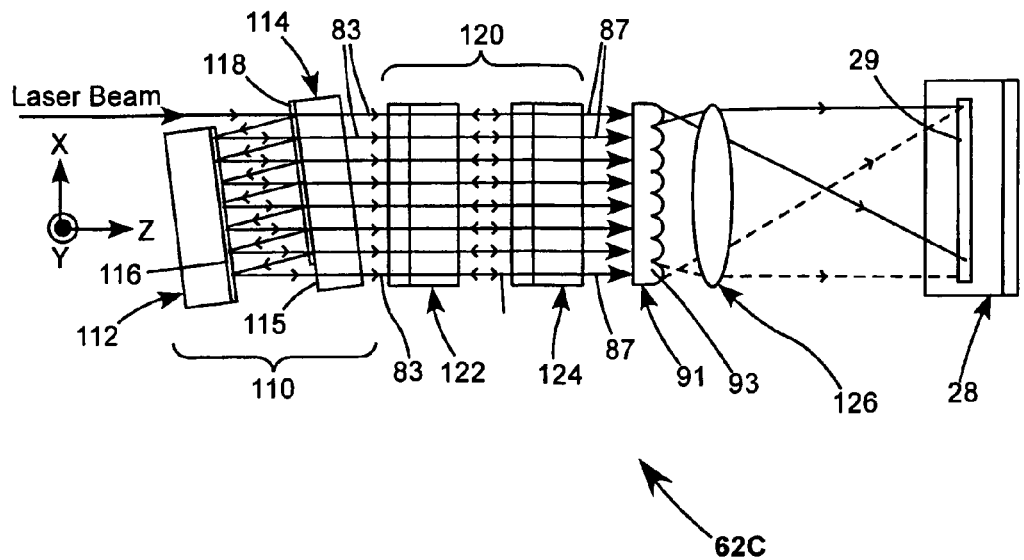
FIG. 5A is an X-axis elevation view schematically illustrating yet another preferred example in accordance with the present invention of a beam-forming and speckle-reduction arrangement in the projection display of FIG. 2, the beam-forming and speckle-reduction including two multi-pass optical delay lines arranged orthogonal to each other.
Figure 5B:
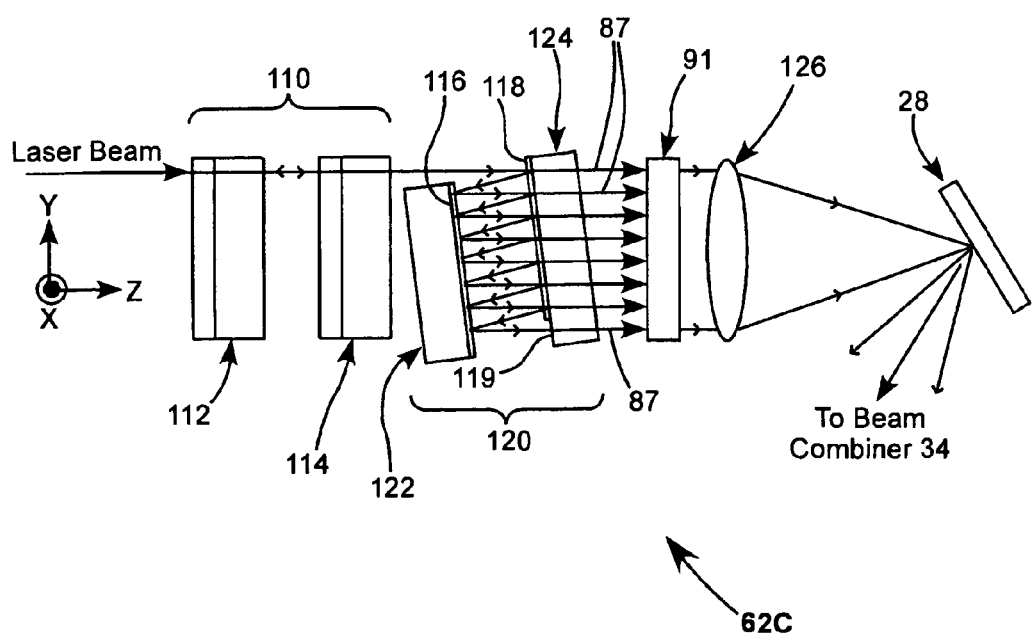
FIG. 5B is a Y-axis plan view from below of the beam-forming and speckle-reduction arrangement of FIG. 5A.

FIG. 5A and FIG. 5B schematically illustrate yet another preferred example 62C of a combined beam-forming optics and speckle-reduction arrangement in accordance with the present invention. In arrangement 62C, a beam of light from a laser is passed into an optical delay line 110 including spaced-apart plates 112 and 114. Facing surfaces of the plates are parallel to each other and parallel to the Y-axis, but tilted with respect to the Z-axis. The facing surface of plate 112 has a fully reflective coating 116 thereon. The facing surface of plate 114 has a partially reflective and partially transmissive coating 118 over most of the surface, a section 115 of the surface being left uncoated, or preferably furnished with an antireflection coating (not shown). Outward facing surfaces of the plates are also preferably also furnished with an antireflection coating. The laser beam enters the delay line by bypassing plate 112. The beam is incident on coating 118, where a portion of the beam is reflected and a portion transmitted. The reflected portion is directed to fully reflective coating 116 and reflected again to coating 118 on plate 114. The multiple reflection and transmission between coatings 118 on plate 114 and coating 116 on plate 112 until a beam portion is reflected from coating 116 and transmitted through the uncoated (or antireflection coated) portion 115 of plate 114. In this way, the original single laser beam is divided into a plurality of individual beams 83 (essentially, attenuated replicas of the original beam) aligned parallel with each other in a plane parallel to the X-Z plane.

The number of beams 83 is determined, inter alia, by the tilt of the facing surfaces of plates 112 and 114 with respect to the Z-axis, and the extent of coating 118 on the surface of plate 114. Preferably coating 118 is graded in reflectivity, either continuously or in a sequence of strips (one strip for each reflection), such that the light intensity of each of the beams 83 is about the same. The distance between the facing surfaces, and the tilt, causes any beam 83 to have a longer path length than a previous beam 83 in the sequence of transmission through coating 118. This path length difference (between the successive partial reflections) is selected to be greater than about the coherence length of the laser light, as discussed above with respect to the optical fiber array and stepped optical elements of other examples of inventive beam-forming and speckle-reduction arrangements.

Preferably, the input laser beam is collimated to the extent possible with the particular beam quality of the laser providing the beam. The beam for a laser may be collimated by suitable optics. Since the required path difference between the beams is only a few millimeters, the beam will be usually be sufficiently well collimated, i.e., of sufficiently low divergence, that means to compensate for any divergence will not be necessary. If this is not the case, plate 112 can be replaced by an array of fully reflective, cylindrical concave mirrors, with the mirrors having an X-axis curvature selected such that all beams 83 have about the same X-axis height.

Continuing with reference to FIGS. 5A and 5B, each of the beams 83 enters another optical delay line 120. Delay line 120 includes spaced apart plates 122 and 124 with surfaces thereof parallel to each other, parallel to the X-axis, but tilted with respect to the Z-axis, i.e., delay line 120 is orthogonally arranged with respect to delay line 110. The facing surface of plate 122 has a fully reflective coating 116 thereon. The facing surface of plate 124 has a partially reflective and partially transmissive coating 118 over most of the surface, a section 119 of the surface being left uncoated or furnished with an antireflection coating (not shown). Outward facing surfaces of the plates are also preferably antireflection coated as discussed above. Each of beams 83 enters delay line 120 by bypassing plate 122. Each of the beams 83 is then divided into a plurality of beams 87, delayed one with respect to the next by the multiple reflection and transmission sequence described above for delay line 110.

Beams 87 will provide in effect a two-dimensional array of $N_1*N_2$ mutually incoherent sources of illumination of the modulator where $N_1$ is the number of beams provided by delay line 110 and $N_2$ is the number of beams 87 into which each beam 83 is divided. In the arrangement of FIGS. 5A and 5B, $N_1$ and $N_2$ are both equal to eight. However, neither the equality of $N_1$ and $N_2$ nor the particular value of eight beams per division should be considered as limiting the present invention.

Beams 87 are incident on an array 91 of cylindrical lenses 93. The cylindrical lenses have positive optical power in the X-axis and zero optical power in the Y-axis. Lens array 91 is cooperative with focusing optics 126. The lens array and focusing optics are configured such that X-axis light from each lens 93 fills the length of elements 29 of modulator 28, and such that Y-axis light is focused by the focusing optics into to the width of the elements 29. Modulator 28 directs reflected and diffracted light from the modulator to a beam-combining prism 34 as discussed above.

Figure 6:
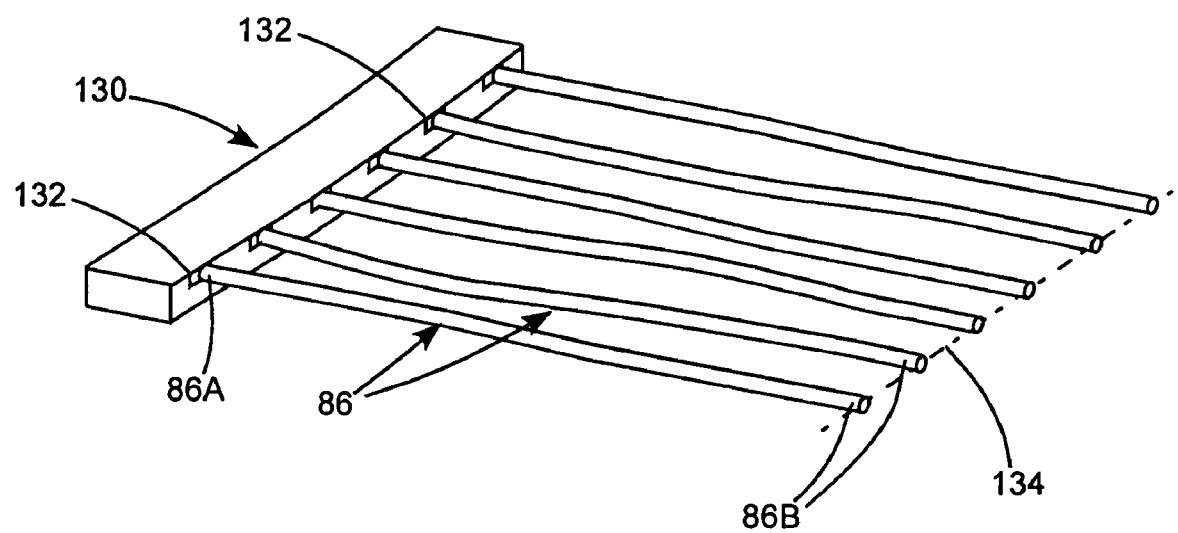
FIG. 6 is a three-dimensional view schematically illustrating one arrangement for coupling light from a plurality of emitters of a diode-laser bar into a corresponding plurality of optical fibers suitable for use as the plurality of output fibers of the beam-forming and speckle-reduction arrangement of FIGS. 3A and 3B.

In the discussion of laser 62A of FIGS. 3A and 3B presented above, it is pointed out that a diode-laser bar and a plurality of individual fibers may by substituted for an arrangement of branch fibers dividing light from a single laser beam. It is pointed out that output ends of the individual fibers may be precisely aligned to compensate for any smile effect in the diode-laser bar. Such an arrangement is illustrated in FIG. 6, which schematically depicts a diode-laser bar 130 having a plurality of individual emitters (diode-lasers) 132. Diode-laser bar 130 is depicted as being bowed to simulate the smile effect that is frequently encountered in such bars and which leads to the individual emitters not lying in a preferred, exactly straight line. In FIG. 6, one optical fiber 86 is butt-coupled to each emitter of the diode-laser bar via an input end 86A of the fiber. Here, it should be noted that the emitters are depicted as being bigger than the fiber diameter for convenience of illustration, although this would usually not be the case in practice. Output ends 86B of the fibers are precisely aligned along a line 134. In this way, this form of fiber-coupling overcomes the smile effect of the diode-laser bar. Further, each fiber homogenizes the light from each emitter providing an additional benefit. Precise alignment of the fibers of the fibers can be accomplished using a suitable jig.

It should be noted that instead of butt-coupling the fibers to the emitters as depicted, a fast-axis (of the diode-laser bar) cylindrical lens, together with a slow axis cylindrical lens array, can be used to couple (focus) light from each emitter into the corresponding fiber 86. This form of coupling however is influenced by the smile effect, inasmuch as the fast-axis cylindrical lens can not be in optimum alignment with all emitters, and, accordingly, the coupling efficiency into each fiber can be different. It should noted that the length of fibers 86 in this arrangement does not need to be different to provide mutually incoherent light sources, as light outputs from the individual emitters are mutually incoherent.

The reference number of output fibers in this arrangement is made the same as that of branch fibers in FIGS. 3A and 3B. This is because the diode-laser bar with individual fibers of FIGS. 5A and 5B can be readily substituted for the individual laser and branched fiber arrangement of FIGS. 3A and 3B. In this case, the line 134 along which output ends of the fibers are aligned would be aligned parallel to the X-axis. There need not be a particular alignment between the X and Y-axes of the beam forming optics and the fast and slow-axes of the diode-laser bar.

Figure 7A:
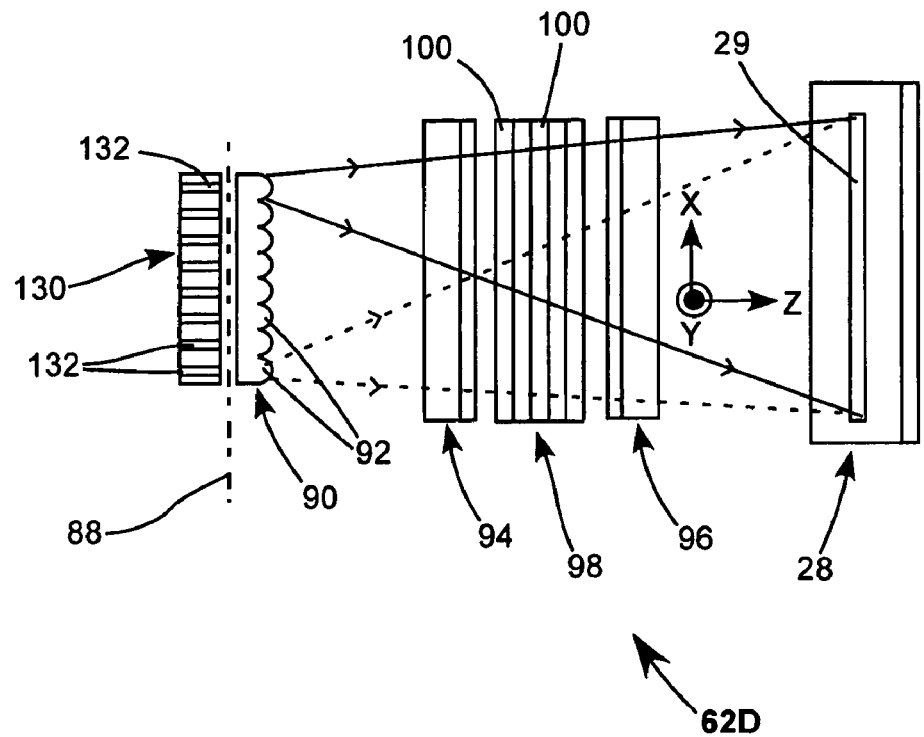
FIG. 7A is an X-axis elevation view schematically illustrating still another preferred example in accordance with the present invention of a beam-forming and speckle-reduction arrangement in the projection display of FIG. 2, similar to the arrangement of FIGS. 3A and 3B, but wherein a diode-laser bar having a plurality of spaced apart emitters is substituted for the laser and plurality of optical fibers.
Figure 7B:
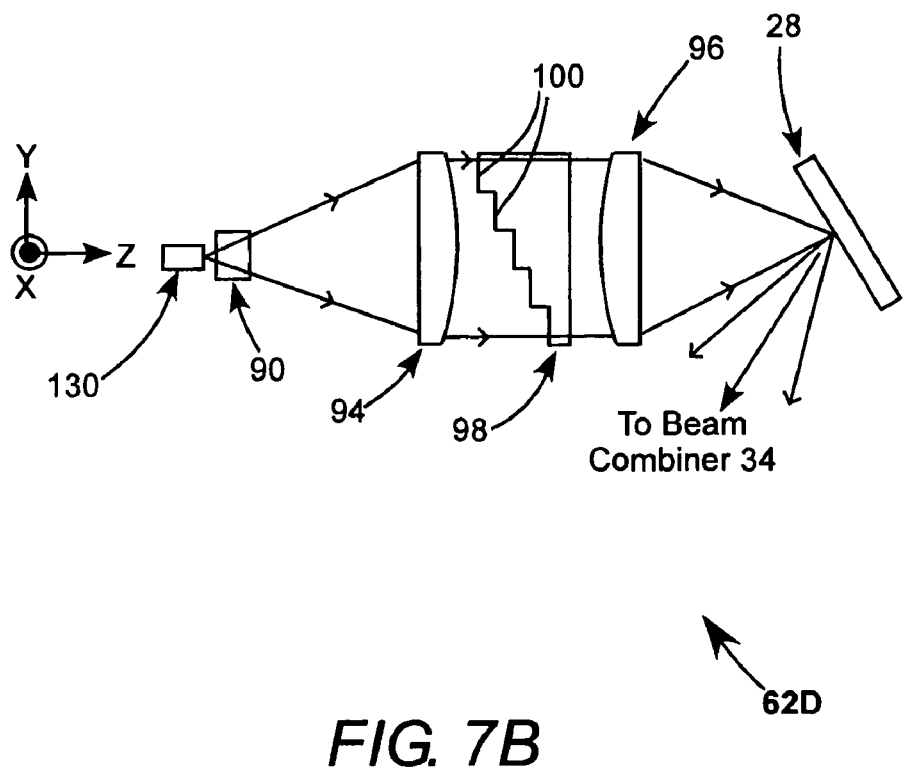
FIG. 7B is a Y-axis plan view from below of the beam-forming and speckle-reduction arrangement of FIG. 7A.

It should be noted that diode-laser bar and fiber arrangement described above is primarily useful when the smile effect (emitter misalignment) in the diode-laser bar is greater than the width of the modulator being illuminated, for example, greater than about 25 µm. If this is not the case, then the diode-laser bar, without any fiber coupling can be substituted for the laser beam and branched fiber arrangement of laser 62A. This is illustrated in FIG. 7A and FIG. 7B. Here, still another embodiment 62D of a combined beam-forming optics and speckle-reduction arrangement in accordance with the present invention. Arrangement 62D is similar to arrangement 62A with an exception that a diode-laser bar 130 having a plurality of emitters 132 is coupled directly to cylindrical lens array 90. Emitters 132 are aligned along the X-axis, and each emitter 132 is aligned with a corresponding one of cylindrical lenses 92 in lens array 90. Each emitter 132 emits a beam of coherent-light, however, the coherent-light beams so emitted are not coherent with each other. Accordingly dividing each of the beams into portions via element 98, provides the effective $N_1 \times N_2$ array of mutually incoherent sources for illuminating the linear modulator.

Those skilled in the art will recognize that the above-described examples of the inventive beam-forming and speckle-reduction arrangements do not represent all possible examples and may devise other similar examples without departing from the spirit and scope of the present invention. By way of example a delay line as described with reference to FIGS. 5A and 5B may be used, with supplementary optics, in place of the branched optical fiber of the arrangement of FIGS. 3A and 3B. Further, while the beam-forming and speckle-reduction arrangements described above have been described with reference to illuminating only one particular modulator (modulator 28) of the three modulators of the display of FIG. 2, any of the arrangements may be suitable for any of the modulators. It should be noted also that while above described embodiments have been described in the context of illuminating a linear GLV monitor, these and any other embodiments may be used with any other linear spatial light modulator without departing from the spirit and scope of the present invention.

In summary, the present invention is described above in terms of a preferred and other embodiments. The invention is not limited, however, to the embodiments described and depicted. Rather, the invention is limited only by the claims appended hereto.

What is claimed is:

1. A method of projecting light from a coherent light source onto a one-dimensional spatial light modulator as a line of light having a length and a width, the method comprising the steps of:

dividing the light from the light source in a manner such that the divided light is effectively formed into a rectangular, two-dimensional array of $N_1 \times N_2$ mutually incoherent light-sources;

projecting light from the mutually incoherent light-sources along a first axis onto the spatial light modulator to form the length of the line of light;

projecting light from the mutually incoherent light-sources along a second, orthogonal axis, onto the spatial light modulator to form the width of the line of light; and wherein the light-dividing step is accomplished without using any moving components.

2. The method of claim 1, wherein the coherent light source delivers a single beam of coherent light, with light therein having a coherence length, and wherein the beam is divided into $N_1$ mutually incoherent portions by a first optical arrangement and each of the $N_1$ beam portions is divided into $N_2$ mutually incoherent portions by a second optical arrangement.

3. The method of claim 2, wherein said first optical arrangement is an optical fiber arrangement having a single input end arranged to receive light from the coherent light source and $N_1$ output ends with optical path lengths from the input end to each of the output ends differing from each other by an amount greater than about the coherence length of light in the light beam.

4. The method of claim 3, wherein said second optical arrangement includes a stepped optical element having $N_2$ steps, with each of the $N_2$ beam portions having traveled a different optical path length in the stepped optical element, said optical path difference being greater than about the coherence length of light in the light beam.

5. The method of claim 2, wherein said first and second optical arrangements include respectively first and second stepped optical elements having respectively $N_1$ and $N_2$ steps, with steps of said first element oriented perpendicular to steps of said second optical element, wherein the $N_1$ beam portions travel a different optical path length in the first stepped optical element, wherein the $N_2$ portions travel a different optical path in the second stepped optical element, and wherein the optical path differences in said first and second stepped optical elements are greater than about the coherence length of light in the light beam.

6. The method of claim 2, wherein said first and second optical arrangements include respectively first and second optical delay lines each of said optical delay lines including a pair of spaced apart parallel plates with said parallel plate pairs being oriented perpendicular to each other, said first delay line dividing said beam into said $N_1$ portions by multiple partial reflections of the beam between the plates thereof and said second delay line dividing each of said beam portions in to said $N_2$ beam portions by multiple partial reflections of the beam between the plates thereof, and wherein the distance traveled by light between successive partial reflections in said delay lines is greater than about the coherence length of light in the light beam.

7. The method of claim 2, wherein $N_1$ and $N_2$ are equal.

8. The method of claim 7, wherein $N_1$ and $N_2$ are each equal to 8.

9. The method of claim 1, wherein the coherent light source delivers a $N_1$ spaced-apart beams coherent light beams incoherent with each other, and wherein an optical arrangement divides each of said $N_1$ beams into $N_2$ mutually incoherent portions.

10. The method of claim 9, wherein said second optical arrangement includes a stepped optical element having $N_2$ steps, with each of the $N_2$ beam portions having traveled a different optical path length in said stepped optical element, said optical path difference being greater than about the coherence length of light in the light beams.

11. The method of claim 9, wherein said coherent light source is a diode-laser bar including $N_1$ spaced-apart emitters, each of said emitters emitting one of said $N_1$ beams.

12. An apparatus for projecting light onto a one-dimensional spatial light modulator comprising:
   a light source generating a coherent light beam;
   first means for creating a plurality of mutually incoherent light portions along a first axis perpendicular to the propagation axis of the light beam;
   second means for creating a plurality of mutually incoherent light portions along a second axis perpendicular to said first axis; and
   optics for projecting the incoherent light portions onto the one-dimensional spatial light modulator to create a line of light, with the light propagating along said first axis defining the length of the line and with the light propagating along said second axis defining the width of the line.

13. An apparatus as recited in claim 12, wherein one of said means comprises an optical arrangement including a stepped optical element having a plurality of steps, with each of the light portions traveling a different optical path length in the stepped optical element.

14. An apparatus as recited in claim 12, wherein both of said means comprises an optical arrangement including a stepped optical element having a plurality of steps, with each of the light portions traveling a different optical path length in the stepped optical element and wherein the stepped optical element of the first means is oriented perpendicularly to the stepped optical element of the second means.

15. An apparatus as recited in claim 12, wherein one of said means comprises an optical delay line including a pair of spaced apart parallel plates, said delay line dividing said beam by multiple partial reflections of the beam between the plates thereof to create said plurality of mutually incoherent light portions.

16. An apparatus as recited in claim 12, wherein both of said means comprises an optical delay line including a pair of spaced apart parallel plates, said delay line dividing said beam by multiple partial reflections of the beam between the plates thereof to create said plurality of mutually incoherent light portions, with the parallel plates of the first means being oriented perpendicularly to the parallel plates of the second means.

17. An apparatus as recited in claim 12, wherein said first means comprises an optical fiber arrangement having a single input end arranged to receive light from the coherent light source and a plurality of output ends with optical path lengths from the input end to each of the output ends differing from each other to create said plurality of mutually incoherent light portions.

* * * * *